US007496600B2

(12) United States Patent
Godley

(10) Patent No.: US 7,496,600 B2
(45) Date of Patent: Feb. 24, 2009

(54) SYSTEM AND METHOD FOR ACCESSING WEB-BASED SEARCH SERVICES

(75) Inventor: Hector Stuart Godley, Harrogate (GB)

(73) Assignee: Taiwan Semiconductor Manufacturing Co., Ltd., Hsin-Chu (TW)

(*) Notice: Subject to any disclaimer, the term of this patent is extended or adjusted under 35 U.S.C. 154(b) by 280 days.

(21) Appl. No.: 11/001,768

(22) Filed: Dec. 2, 2004

(65) Prior Publication Data

US 2006/0122969 A1    Jun. 8, 2006

(51) Int. Cl.
*G06F 17/00* (2006.01)
(52) U.S. Cl. .............. 707/104.1; 707/10; 707/101; 707/102; 707/103 R; 715/206; 715/744
(58) Field of Classification Search .......... 707/101, 707/102, 103 R, 205, 3, 10, 501.1, 104.1; 715/744, 206; 709/224, 245, 246
See application file for complete search history.

(56) References Cited

U.S. PATENT DOCUMENTS

| 6,049,812 | A  | * | 4/2000  | Bertram et al. ........... 715/516 |
| 6,105,021 | A  | * | 8/2000  | Berstis .................... 707/3 |
| 6,208,995 | B1 | * | 3/2001  | Himmel et al. ......... 707/104.1 |
| 6,211,871 | B1 | * | 4/2001  | Himmel et al. .......... 715/744 |
| 6,408,316 | B1 | * | 6/2002  | Himmel et al. ........ 715/501.1 |
| 6,728,702 | B1 | * | 4/2004  | Subramaniam et al. ..... 707/3 |
| 6,874,019 | B2 | * | 3/2005  | Hamilton et al. ......... 709/219 |
| 6,993,531 | B1 | * | 1/2006  | Naas ..................... 707/102 |
| 7,003,721 | B1 | * | 2/2006  | Ramaley et al. .......... 715/210 |
| 7,076,546 | B1 | * | 7/2006  | Bates et al. ............. 709/224 |
| 2002/0087559 | A1 | * | 7/2002  | Pratt ..................... 707/100 |
| 2002/0194222 | A1 | * | 12/2002 | Kaply et al. ............. 707/513 |
| 2003/0038839 | A1 | * | 2/2003  | Simpson et al. .......... 345/745 |
| 2005/0171932 | A1 | * | 8/2005  | Nandhra ................. 707/3 |
| 2006/0080292 | A1 | * | 4/2006  | Alanzi ................... 707/3 |

FOREIGN PATENT DOCUMENTS

CN      1522418      8/2004
TW       552521      9/2003

OTHER PUBLICATIONS

Wendy Mackay et al., "The missing link: Augmenting biology laboratory notebooks", ACM, Oct. 2002, pp. 41-50.*
Unmil Karadkar et al., "Display-agnostic hypermedia", ACM, Aug. 2004, pp. 58-67.*
CN Office Action mailed Jul. 6, 2007.
Taiwan Office Action mailed Sep. 14, 2006.

* cited by examiner

*Primary Examiner*—Thuy N Pardo
(74) *Attorney, Agent, or Firm*—Thomas, Kayden, Horstemeyer & Risley

(57) ABSTRACT

A system for accessing web-based search services. The system contains a search module, a storage device, a link extracting module, and page generating module. The search module provides, in a first browser window, a first list comprising hyperlinks to web pages that match search criteria. The storage device comprises a temporary data field temporarily storing a second list of hyperlinks. The link extracting module retrieves a hyperlink from the first list and adds it to the second list of hyperlinks. The page generating module generates, on a second browser window, a webpage corresponding to one of the hyperlinks in the second list.

16 Claims, 5 Drawing Sheets

SYSTEM AND METHOD FOR ACCESSING WEB-BASED SEARCH SERVICES

BACKGROUND

The present invention relates generally to searching for information on networks and particularly to a computerized system and method for accessing information from web-based search services.

The World Wide Web (the "web") provides access to information in the form of web pages. A web page is a document available on the web. Every web page is identified by a unique address referred to as a uniform resource locator (URL). A web browser is a software application used to locate and display web pages. To locate a web page with a browser, a user must know the URL for the page. If a user does not know the URL or just wants to find information on a particular topic, a user typically uses a search engine.

A search engine is a utility that will search the Internet, an Intranet, a site, or a database for terms specified by the user. search engines consist of multiple elements. A first element is a program that roams the area to be searched, collecting data and links to more data. A second element is an index of the data collected to enable fast access to searched terms. A third element is a search interface, the form in which a user enters his/her search terms and the software behind it that queries the index, retrieves matches, ranks matches for relevance and organizes the data for follow-up searches.

When a user wants to locate information on a particular topic, he or she inputs keywords in a search interface of a search engine. A search engine program then searches web pages to match the keyword, and provides an index of the web pages. The web pages found by the program are presented by listing corresponding URLs on a web page returned by search interface.

Search engines are an important method of locating information on the web, however, the results that they return can be unorganized and highly depend on the skill of the user queries, the types of words used by web page developers, as well as the search and syntax rules used by the search engine. Search results are typically displayed lone list of hyperlinks which must be sifted through to locate relevant items. In order to evaluate relevancy of each item in the search result, users have to go deep into websites corresponding to the hyperlinks in the search result. The website is displayed using the same browser window presenting the search result. After checking a particular website linked from a found hyperlink, users go back to the search result, and click another hyperlink to check the corresponding web page. The process of evaluating web page relevancy is time consuming, and because of the repeated back-and-forth linking procedure, users are easily confused and misdirected by the various web pages. Additionally, it is difficult to utilize useful URLs obtained in a previous search session. Many browser vendors provide a "bookmark tool" to maintain a list of favorite URLs considered useful by users. The list maintained by the bookmark tool, however, expands significantly during usage. As the list grows longer, effective utilization thereof becomes difficult.

Hence, there is a need for a system and method for accessing web-based search services which addresses the inefficiency arising from the existing technology.

SUMMARY

It is therefore an object of the invention to provide a system and method for accessing web-based search services.

To achieve this and other objects, the present invention provides a system and method for accessing web-based search services building a temporary list of favorite hyperlinks, wherein the hyperlinks in the temporary list can be customized for selection, and web pages corresponding to selected hyperlinks are displayed simultaneously in separate browser windows.

According to one embodiment of the invention, a system for accessing web-based search services is provided. The system contains a search module, a storage device, a link extracting module, and page generating module. The search module provides, in a first browser window, a first list comprising hyperlinks to web pages that match search criteria. The storage device comprises a temporary data field temporarily storing a second list of hyperlinks. The link extracting module retrieves a hyperlink from the first list and adds it into the second list of hyperlinks. The page generating module generates, in a second browser window, a webpage corresponding to a hyperlink in the second list.

The present invention also provides a method of accessing web-based search services. First, a first list of hyperlinks is provided in a first browser, wherein the hyperlinks correspond to web pages that match a keyword specified by a user. Second, a first selection comprising at least one of the hyperlinks in the first list is provided. The first selection is stored temporarily in a second list of hyperlinks. A second selection comprising at least one of the hyperlinks in the second list is then provided. The web pages corresponding to the hyperlinks of the second selection are then displayed in separate browser windows.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION

In the following detailed description of the embodiment, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is only defined by the appended claims. The leading digit(s) of reference numbers appearing in the Figures corresponds to the Figure number, with the exception that the same reference number is used throughout to refer to an identical component which appears in multiple Figures.

Figure 1:
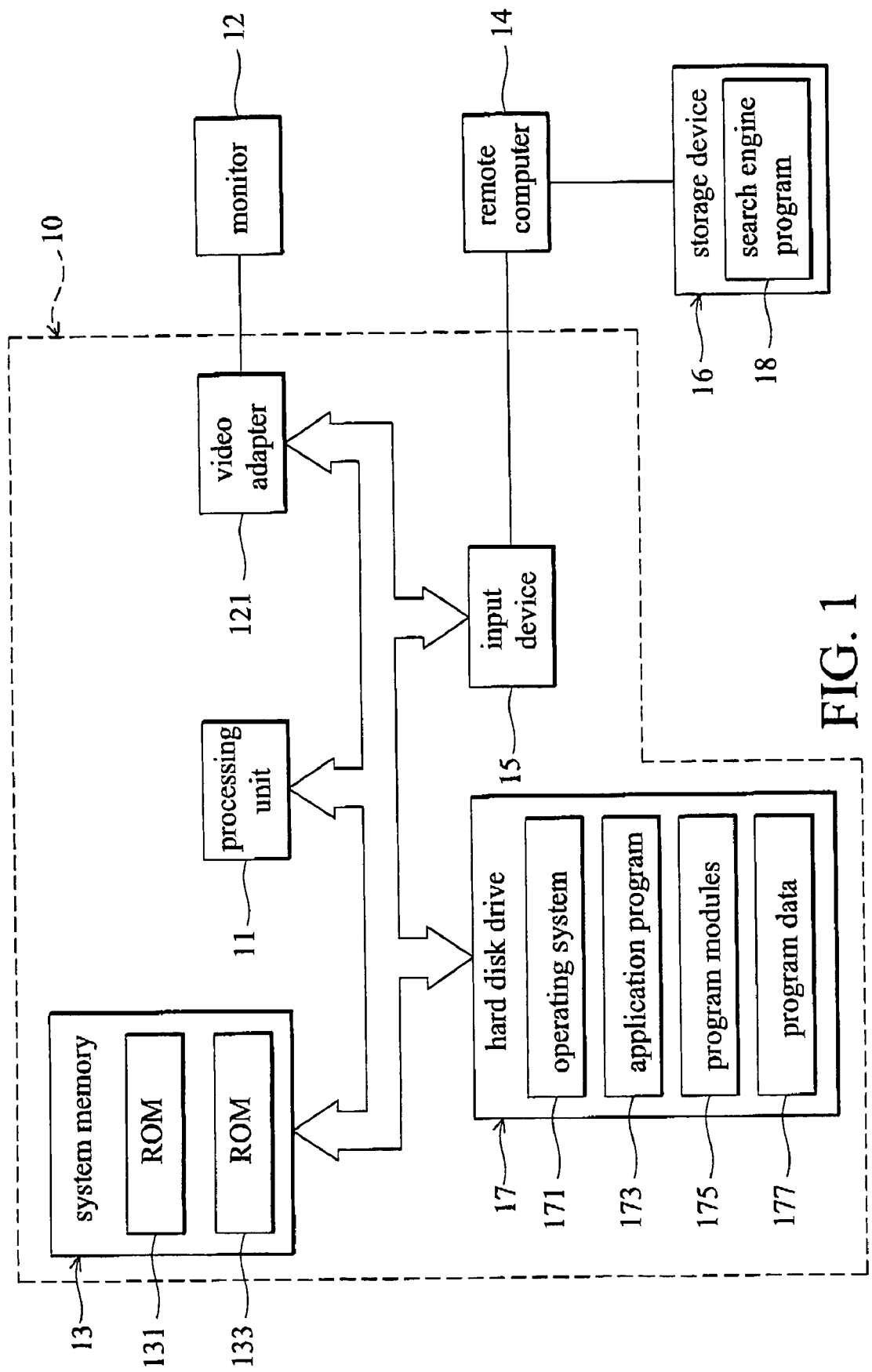
FIG. 1 shows an exemplary computer system in which the invention may be implemented.

FIG. 1 provides a brief, general description of a suitable computing environment in which the invention may be implemented. The invention will hereinafter be described in the general context of computer-executable program modules, containing instructions executed by a personal computer (PC). Program modules include routines, programs, objects, components, data structures, etc. performing particular tasks or implementing particular abstract data types. Those skilled in the art will appreciate that the invention may be practiced with other computer- system configurations, including hand-held devices, multiprocessor systems, microprocessor-based programmable consumer electronics, network PCs, mini-computers, mainframe computers, and the like.

FIG. 1 illustrates a general-purpose computing device in the form of a personal computer 10, which comprises processing unit 11, system memory 13, and system bus 19. The system bus 19 couples the system memory 13 and other system components to processing unit 11. System bus 19 may be any of several types, including a memory bus or memory controller, a peripheral bus, and a local bus, and may use any of a variety of bus structures. System memory 13 includes read-only memory (ROM) 131 and random-access memory (RAM) 133. A basic input/output system (BIOS), stored in ROM 131, contains the basic routines that transfer information between components of personal computer 10. Personal computer 10 further comprises hard disk drive 17 for reading from and writing to a hard disk (not shown). The drive and its associated computer-readable media provide nonvolatile storage of computer-readable instructions, data structures, program modules and other data for personal computer 10. Although the exemplary environment described herein employs a hard disk, those skilled in the art will appreciate that other types of computer-readable media which can store data accessible by a computer may also be used in the exemplary operating environment. Such media may include magnetic disks, optical disks, magnetic cassettes, flash-memory cards, digital versatile disks, and the like. Program modules may be stored on the hard disk 17, ROM 131, and RAM 133. Program modules may include operating system 171, one or more application program 173, other program modules 175, and program data 177. A user may enter commands and information into personal computer 10 through input device 15, such as a keyboard, pointing device, microphone, joystick, and the like. A monitor 12 or other display device also connects to system bus 19 via an interface such as a video adapter 121.

Personal computer 10 may operate in a networked environment using logical connections to one or more remote computers such as remote computer 14. Remote computer 14 may be another personal computer, a server, a router, a network PC, a peer device, or other common network node. It typically includes many or all of the components described above in connection with personal computer 10, however, only a storage device 16 is illustrated in FIG. 1. The storage device 16 stores a search engine program 18, which provides a web-based search service to the personal computer 10. The remote computer 14 is connected to personal computer 10 through a local-area network (LAN) and/or a wide-area network (WAN). When placed in a LAN networking environment, personal computer 10 connects to the local network through a network interface or adapter (not shown). When used in a WAN networking environment such as the Internet, personal computer 10 typically includes a modem or other means for establishing communications over a WAN. In a network environment, program modules depicted as residing with personal computer 10 or portions thereof may be stored in remote storage device 16. Of course, the network connections described are illustrative, and other means of establishing a communications link between the computers may be substituted.

The application program 173 in the personal computer 10 includes one of any commonly available software applications , such as a browser, used to locate and display web pages. Using the browser, a user accesses the system of the present invention.

Figure 2:
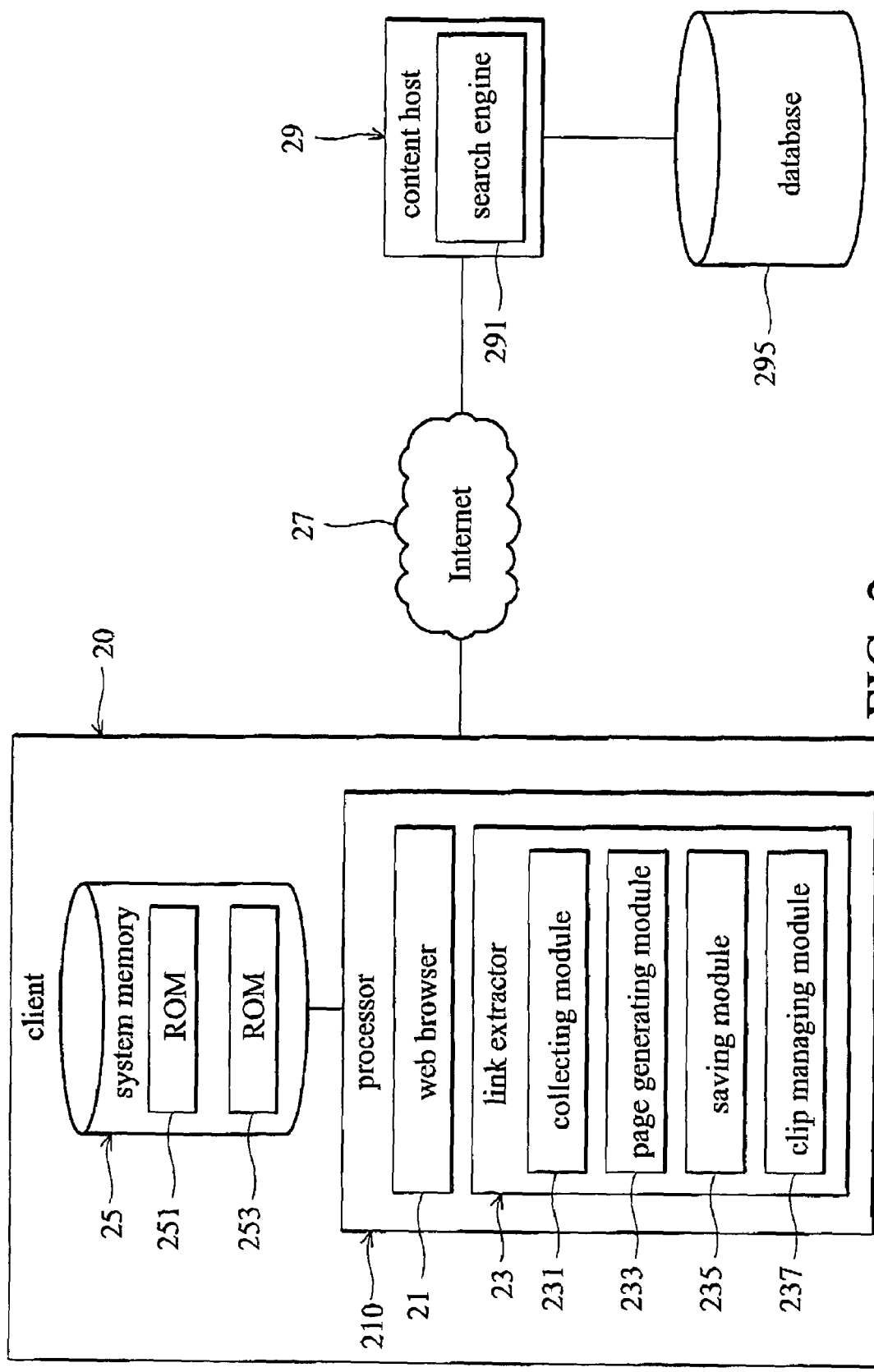
FIG. 2 is a schematic view of the web-based search service system of the present invention.

FIG. 2 is a schematic view of the web-based search service system of the present invention. In FIG. 2, two computers are shown in a typical Internet based network incorporating the system of accessing web-based search services of the present invention.

A client 20 is a web client running one of many commonly available software applications used to locate and display web pages. Web pages are meant to describe any type of content that resides on a computer which may be viewable by a client computer. Typically today, the Internet is a networked group of computers which share information stored on them in many different ways. The use of the term Internet and Web are not meant to be limited to the forms in which they currently exist. The invention is applicable to any type of network having information which may be viewed or transferred between computers. In one embodiment, the software applications running on a processor 210 the client 20 include a web browser 21 displaying graphics and text such as Internet Explorer, and a link extractor 23 taking selected hyperlinks out of a list of hyperlinks displayed on a browser window provided by the web browser 21. The web browser 21 manages a bookmark file 251 stored permanently in a storage device 25, wherein the bookmark file 251 comprises a list of favorite hyperlinks specified by a user. The link extractor 23 comprises a collecting module 231, a page generating module 233, a saving module 235, and a clip managing module 237. The link extractor 23 loads the selected hyperlinks in a link clip 253 stored temporarily in the storage device 25. The link clip 253 is refreshed when a new search session begins or upon a refresh command from a user.

The client 20 is coupled through an Internet 27 to a content host 29. The content host 29 comprises a search engine 291 that provides search capabilities for content stored on a database 295. The database 295 may be plain storage, or any form of database capable of providing content and being searchable. The search engine 291 receives search commands from information entered by a user on the client 20 and executes the commands to retrieve desired content. After the search is complete, the search engine 291 sends the search result to the client 20. The search result is generally a long list of hyperlinks corresponding to web pages that match a keyword specified by the user. The web browser 21 displays the search result in a browser window. The collecting module 231 then retrieves at least one selected hyperlink from the search result and stores it in the link clip 253. The page generating module 233 then presents the link clip on the browser window same with the search result. In the browser window, each item of the link clip 253 is presented together with a check box. The user can select a plurality of items by ticking the check boxes, and the page generating module 233 generates web pages corresponding to the selected hyperlinks in separate browser windows, respectively. The user can organize the link clip 253 using the clip managing module 217. If the user considers one web page corresponding to a hyperlink in the link clip 253 very useful and decides to store the hyperlink permanently, he or she can store the specified hyperlink in the bookmark file 251 using the saving module 235.

Figure 3:
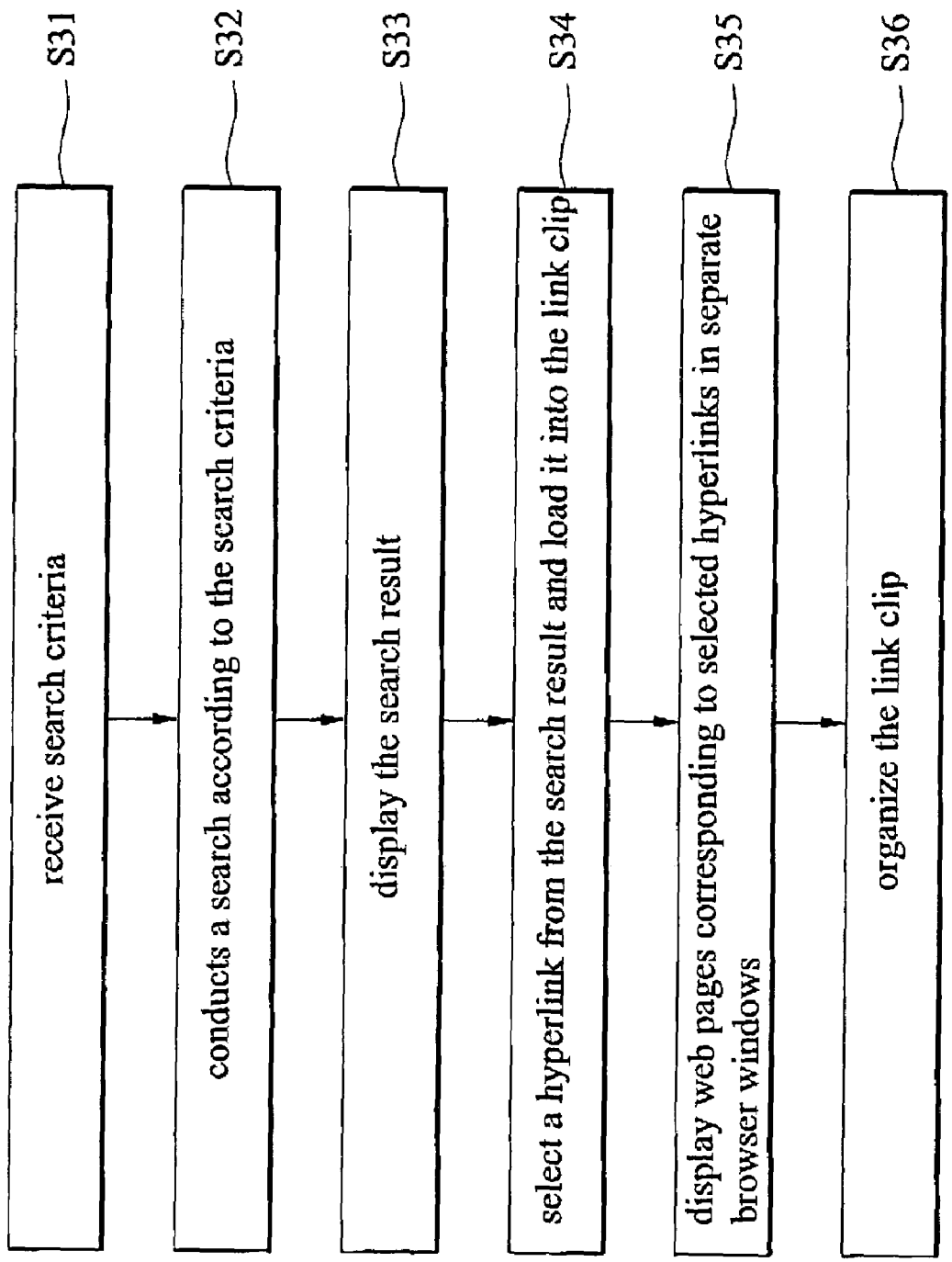
FIG. 3 is a flowchart showing the method of accessing the web-based search service of the present invention.

FIG. 3 is a flowchart showing the method of accessing web-based search services of the present invention.

First, a user inputs at least one keyword as search criteria for a search engine 251 conducting a web-based search (step S31) The search engine 251 accepts user-submitted search criteria and conducts a search to select associated addresses of web pages that meet all or part of the search criteria (step S32). The web pages, which may be considered data files, are found at addresses to which the search engine can link to load the data files, for example being accessible using uniform resource locator (URL) addressing of the pages as hypertext markup language (html), file transfer protocol (ftp), telnet or other such file types. The data file may have embedded links to other data files or to graphics or other media files. The search results can potentially be ranked, subdivided into categories, and similarly handled according to known search engine operation.

Figure 4:
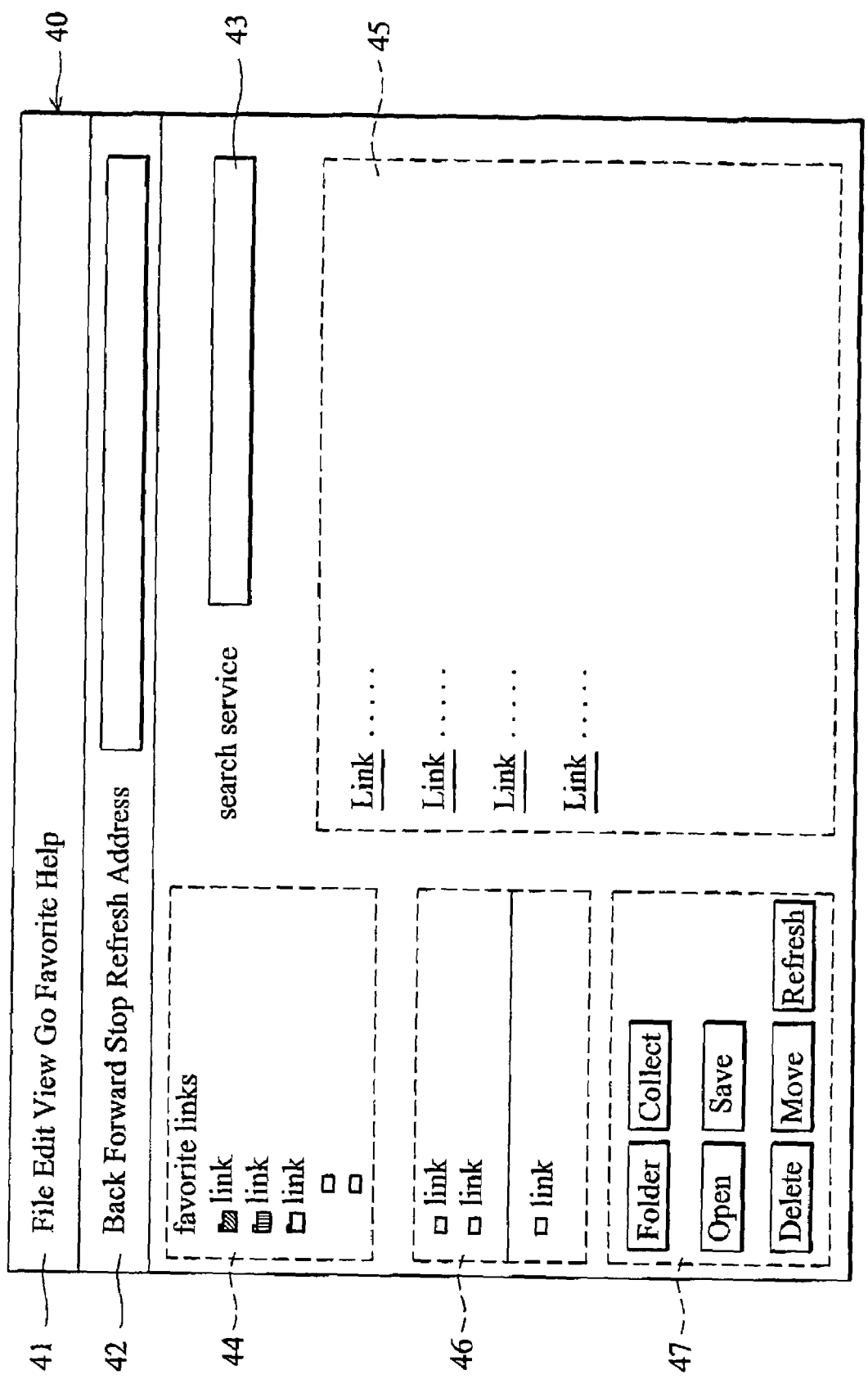
FIG. 4 is a rough block diagram of a browser window or screen according to the embodiment of the present invention.

The search result, including network addresses of the files found to at least partly meet the query, is then displayed on a first browser window presented to the user on the client 20 (step S33). The first browser window is illustrated in FIG. 4. The user views the search result presented in the first browser window and checks some web pages to see whether the found web pages are relevant. If the user considers one or more of the web pages to be relevant, the collecting module 231 can be used to copy the selected a hyperlink from the search result and load them into the link clip 253 (step 34). The link clip 253 is presented in the same browser window as the search result, as illustrated in FIG. 4. Each item of the link clip 253 is presented together with a check box enabling the user to select one or more items in the link clip. The user can select a plurality of items by ticking corresponding check boxes, and the page generating module 233 causes generates web pages corresponding to the selected items in separate browser windows, respectively (step S35). The check boxes can be selected by default, such that the user only needs to choose the one that he or she is not interested in. Alternatively, the check boxes can be blank by default, requiring the user to tick a check box corresponding to a web page of interest. The user can then view the simultaneously presented browser windows, and decide whether the web pages corresponding to the hyperlinks in the link clip are truly relevant. Additionally, the check boxes can be switched to default settings when the web pages corresponding to the selected item are displayed in separate browser windows, thus the check boxes are ready for receiving a selection in the following step.

The link clip 253 can then be organized by the user (step S36). For example, if some of the hyperlinks in the link clip are found irrelevant to the search criteria, they can be deleted from the link clip. If some of the hyperlinks in the link clip are considered relevant and useful, they can be moved from the link clip to a permanently stored bookmark file. The link clip is stored directly under the root directory in the bookmark file. The link clip can be refreshed when a new search session begins or upon a refresh command from a user.

FIG. 4 shows a rough block diagram of a browser window or screen presented to a user according to the present invention. A page generating module running on the content host 29 provides the basic html or other format of tag based language to client 20 with browser 21 which generates a screen 40. The screen 40 comprises a standard operating system command line 41 and browser navigation buttons 42. The screen 40 is made up of multiple frames, providing different type of links and information. The actual arrangement of the frames and other content of this page may vary as desired. A frame 43 is a search service frame which provides common search features such as a text box for search request entry, some buttons for selecting where to look, and a button for starting the search labeled "go". In response to a user entering one or more keyword, a list of hyperlinks is provided in a frame 45. A frame 44 presents contents in the bookmark file 251, comprising a plurality of previously-stored hyperlinks. Lying below the frame 44 is a frame 46, presenting the contents in a temporarily-stored link clip. On the left corner of the screen 40 is a frame 47, providing several functional buttons for activating the function modules of the link extractor 23, such as collecting module 231, page generating module 233, saving module 235, and clip managing module 237, respectively.

The method and system of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 5:
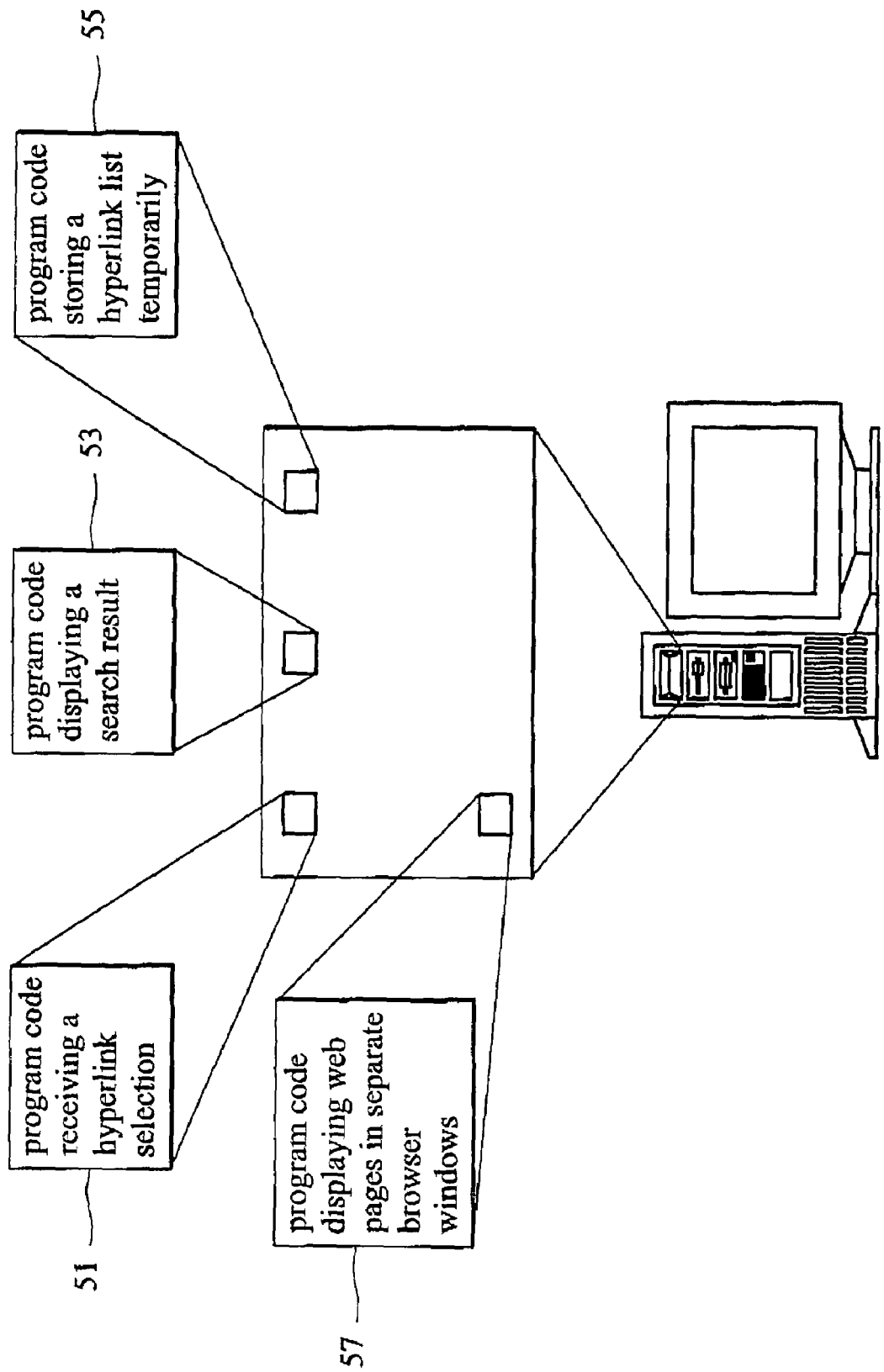
FIG. 5 is a diagram of a storage medium for storing a computer program embodying the method according to the present invention.

FIG. 5 is a diagram of a storage medium for storing a computer program embodying the method according to the present invention. The computer program product comprising a computer usable storage medium having computer readable program code embodied in the medium, the computer readable program code comprising computer readable program code 51 receiving a hyperlink selection, a computer readable program code 53 displaying a search result, a computer readable program code 55 storing a hyperlink list temporarily, and a computer readable program code 57 displaying web pages corresponding to a plurality of selected hyperlinks simultaneously in separate browser windows.

According to the invention as generally shown in FIGS. 1 to 5, the access to a search service is improved and facilitated by offering a user a temporary list of hyperlinks corresponding to a selected number of located web pages corresponding to user search criteria submitted to a search engine. One or more hyperlinks can be further selected from the temporary list by the user, and web pages corresponding to the selected hyperlinks are presented simultaneously using separate browser windows.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for accessing a web-based search service, comprising:
   a search module providing, in a first browser window, a first list comprising hyperlinks to web pages that match search criteria;

a link extracting module retrieving a hyperlink from the first list and adding it into a second list of hyperlinks, wherein the hyperlink, which is retrieved from the first list and added into the second list, is selected by a user;

a storage device storing the second list of hyperlinks temporarily, wherein the storage device further comprises a permanent data field storing a third list of hyperlinks; wherein the link extracting module further stores one of the hyperlinks of the second list into the third list wherein the hyperlink, which is retrieved from the second list and stored in the third list, is selected by the user; and a page generating module generating, in a second browser window, a web page corresponding to one of the hyperlinks in the second list.

2. The system of claim 1, wherein the page generating module further displays the second list of hyperlinks in the first browser window.

3. The system of claim 1, wherein the second list of hyperlinks is refreshed when a browsing session is initiated.

4. The system of claim 1, wherein the link extracting module further creates a check box for each item in the second list for selection.

5. The system of claim 4, wherein the link extracting module further manages the status of the check box corresponding to an item in the second list.

6. The system of claim 1, wherein the link extracting module further rearranges hyperlinks in the second list.

7. A method of accessing web-based search services, comprising:

providing, in a first browser window, a first list comprising hyperlinks to web pages that match search criteria;

receiving a first selection comprising at least one of the hyperlinks of the first list, wherein the first selection is determined by a user;

storing the first selection in a second list comprising hyperlinks that are temporarily stored;

receiving a second selection comprising at least one of the hyperlinks in the second list, wherein the second selection is determined by the user;

displaying web pages corresponding to the hyperlinks of the second selection in separate browser windows; and storing one of the hyperlinks of the second list in a third list comprising permanently stored hyperlinks, wherein the hyperlink, which is retrieved from the second list and stored in the third list, is selected by the user.

8. The method of claim 7, further displaying the second list of hyperlinks in the first browser window.

9. The method of claim 7, further refreshing the second list when a browsing session initiates.

10. The method of claim 7, further creating a check box for each item in the second list for selection.

11. The method of claim 10, further managing the status of a check box corresponding to an item in the second list.

12. The method of claim 7, further organizing the second list of hyperlinks.

13. A computer readable storage medium storing a computer program providing a method of accessing web-based search service, the method comprising:

displaying, in a first browser window, a first list comprising hyperlinks to web pages that match search criteria;

receiving a first selection comprising at least one of the hyperlinks of the first list, wherein the first selection is determined by a user;

storing the first selection in a second list comprising hyperlinks that are stored temporarily;

receiving a second selection comprising at least one of the hyperlinks in the second list, wherein the second selection is determined by the user;

displaying web pages corresponding to the hyperlinks of the second selection in separate browser windows; and storing one of the hyperlinks of the second list in a third list comprising hyperlinks that are permanently stored, wherein the hyperlink, which is retrieved from the second list and stored in the third list, is selected by the user.

14. The storage medium of claim 13, wherein the method further displaying the second list of hyperlinks in the first browser window.

15. The storage medium of claim 13, wherein the method further creating a check box for each item in the second list for selection.

16. The storage medium of claim 13, wherein the method further managing the status of a check box corresponding to an item in the second list.

* * * * *